(12) United States Patent
Yoshitake

(10) Patent No.: US 8,895,678 B2
(45) Date of Patent: Nov. 25, 2014

(54) CROSS-LINKABLE SILICONE COMPOSITION AND CROSS-LINKED PRODUCT THEREOF

(75) Inventor: Makoto Yoshitake, Funabashi (JP)

(73) Assignee: Dow Corning Toray Co., Ltd., Tokyo (JP)

( * ) Notice: Subject to any disclaimer, the term of this patent is extended or adjusted under 35 U.S.C. 154(b) by 0 days.

(21) Appl. No.: 14/126,140

(22) PCT Filed: Jun. 7, 2012

(86) PCT No.: PCT/JP2012/065181
§ 371 (c)(1),
(2), (4) Date: Mar. 5, 2014

(87) PCT Pub. No.: WO2012/173167
PCT Pub. Date: Dec. 20, 2012

(65) Prior Publication Data
US 2014/0221581 A1    Aug. 7, 2014

(30) Foreign Application Priority Data

Jun. 16, 2011 (JP) ................................ 2011-134124

(51) Int. Cl.
*C08L 83/04* (2006.01)
*C08G 77/38* (2006.01)

(52) U.S. Cl.
CPC ...................................... *C08G 77/38* (2013.01)
USPC .......................................... 525/477; 525/478

(58) Field of Classification Search
None
See application file for complete search history.

(56) References Cited

U.S. PATENT DOCUMENTS

| 3,732,330 | A | * | 5/1973 | Mink et al. ..................... 528/31 |
| 4,198,131 | A | * | 4/1980 | Birdsall et al. ........... 351/159.33 |
| 5,877,237 | A | * | 3/1999 | Nakanishi et al. ............ 523/211 |
| 6,815,520 | B2 | * | 11/2004 | Yoneda et al. ................... 528/31 |
| 7,160,972 | B2 | * | 1/2007 | Young et al. .................... 528/31 |
| 7,625,986 | B2 | * | 12/2009 | Yoshitake et al. ............. 525/478 |
| 7,649,059 | B2 | * | 1/2010 | Yoshitake et al. ............. 525/478 |
| 8,044,162 | B2 | | 10/2011 | Morita et al. |
| 8,080,614 | B2 | | 12/2011 | Morita et al. |
| 2008/0185601 | A1 | * | 8/2008 | Frisch et al. .................... 257/98 |
| 2008/0255304 | A1 | | 10/2008 | Nakashima et al. .......... 525/100 |
| 2008/0318067 | A1 | * | 12/2008 | Itoh et al. ...................... 428/447 |
| 2009/0179180 | A1 | | 7/2009 | Morita et al. |
| 2009/0294796 | A1 | | 12/2009 | Morita et al. |
| 2010/0190395 | A1 | * | 7/2010 | Nozoe et al. .................... 442/59 |
| 2010/0276721 | A1 | | 11/2010 | Yoshitake et al. |
| 2011/0227235 | A1 | * | 9/2011 | Yoshitake et al. ............. 257/791 |
| 2011/0251356 | A1 | * | 10/2011 | Sagawa et al. ................ 525/478 |
| 2011/0313123 | A1 | * | 12/2011 | Kashiwagi ...................... 528/32 |
| 2012/0056236 | A1 | * | 3/2012 | Hamamoto et al. .......... 257/100 |

FOREIGN PATENT DOCUMENTS

| JP | 2007-327019 A | 12/2007 |
| JP | 2008-001828 A | 1/2008 |
| WO | WO 2009/154261 A1 | 12/2009 |

OTHER PUBLICATIONS

International Search Report for Application No. PCT/JP2012/065181 dated Oct. 4, 2012, 3 pages.
English language abstract for JP 2007-327019 extracted from espacenet.com database on May 19, 2014, 22 pages.
English language abstract for JP 2008-001828 extracted from espacenet.com database on May 19, 2014, 17 pages.

* cited by examiner

*Primary Examiner* — Robert S Loewe
(74) *Attorney, Agent, or Firm* — Howard & Howard Attorneys PLLC

(57) ABSTRACT

A cross-linkable silicone composition comprising at least the following components: (A) an organopolysiloxane represented by an average unit formula and containing phenyl and alkenyl groups; (B) an organopolysiloxane represented by a general formula and containing phenyl and alkenyl groups; (C) an organopolysiloxane having in one molecule at least one phenyl group and two silicon-bonded hydrogen atoms; and (D) a hydrosilylation catalyst, can be cross-linked by a hydrosilylation reaction and forms a solid body which has high hardness at room temperature and becomes significantly soft or a liquefied at high temperature.

10 Claims, No Drawings

CROSS-LINKABLE SILICONE COMPOSITION AND CROSS-LINKED PRODUCT THEREOF

RELATED APPLICATIONS

This application is the National Stage of International Patent Application No. PCT/JP2012/065181, filed on Jun. 7, 2012, which claims priority to and all the advantages of Japanese Patent Application No. JP 2011-134124, filed on Jun. 16, 2011 the content of which is incorporated herein by reference.

TECHNICAL FIELD

The present invention relates to a cross-linkable silicone composition that can be cross-linked by a hydrosilylation reaction and to a cross-linked product obtained from the above composition.

BACKGROUND ART

Curable silicone compositions that can be cured by a hydrosilylation reaction are used as coating agents or protective agents for optical semiconductor elements of semiconductor devices such as photo couplers, light-emitting diodes, solid-state imaging devices, etc. Such curable silicone compositions can be exemplified, e.g., by a curable silicone composition comprising at least an organopolysiloxane having in one molecule at least two alkenyl groups where at least 20 mole % of all silicon-bonded organic groups are aryl groups, an organopolysiloxane that contains silicon-bonded hydrogen atoms, an organopolysiloxane where in one molecule at least 5 mole % of all silicon-bonded organic groups are alkenyl groups, at least 5 mole % are aryl groups, at least 5 mole % are alkoxy groups, and at least 5 mole % are epoxy-containing organic groups, and a hydrosilylation catalyst (see Japanese Unexamined Patent Application Publication No. 2007-327019), or a curable silicone composition comprising an organopolysiloxane where in one molecule at least 0.5 mole % of all silicon-bonded organic groups are alkenyl groups, and at least 25 mole % are aryl groups; an organopolysiloxane having in one molecule on average at least two silicon-bonded aryl groups and on average at least two silicon-bonded hydrogen atoms, and a hydrosilylation catalyst (see Japanese Unexamined Patent Application Publication No. 2008-1828).

Since hardness of cured products obtained from the aforementioned curable silicone compositions can be reduced under the effect of heat, these compositions may have stress relaxation effects to semiconductor elements when these composition are used as coating or protective agents for semiconductor elements. However, the proportion of the reduction is not sufficient.

It is an object of the present invention to provide a cross-linkable silicone composition that can be cross-linked by a hydrosilylation reaction and that forms a cross-linked product which is a solid body of high hardness at room temperature and becomes significantly soft or liquefied at high temperature. It is another object of the invention to provide a cross-linked product that is solid and has high hardness at room temperature and that becomes significantly soft or liquefied at high temperature.

DISCLOSURE OF INVENTION

The cross-linkable silicone composition of the invention comprises at least the following components:

(A) an organopolysiloxane represented by the following average unit formula:

$$(R^1_3SiO_{1/2})_a(R^1_2SiO_{2/2})_b(R^1SiO_{3/2})_c(SiO_{4/2})_d(R^2O_{1/2})_e$$

(where $R^1$ are phenyl groups, alkyl or cycloalkyl groups having 1 to 6 carbon atoms, or alkenyl groups having 2 to 6 carbon atoms and where 60 to 80 mole % of $R^1$ are phenyl groups and 10 to 20 mole % of $R^1$ are alkenyl groups; $R^2$ is a hydrogen atom or an alkyl group having 1 to 6 carbon atoms; and "a", "b", "c", "d", and "e" are numbers that satisfy the following conditions: $0 \leq a \leq 0.2$; $0.2 \leq b \leq 0.7$; $0.2 \leq c \leq 0.6$; $0 \leq d \leq 0.2$; $0 \leq e \leq 0.1$; and $a+b+c+d=1$);

(B) an organopolysiloxane represented by the following general formula:

$$R^3_3SiO(R^3_2SiO)_mSiR^3_3$$

(where $R^3$ are phenyl groups, alkyl or cycloalkyl groups having 1 to 6 carbon atoms, or alkenyl groups having 2 to 6 carbon atoms and where 40 to 70 mole % of $R^3$ are phenyl groups and at least one $R^3$ is an alkenyl group; and "m" is an integer in the range of 5 to 100) {this component is used in an amount of 0 to 20 parts by weight per 100 parts by weight of component (A)};

(C) an organopolysiloxane having in one molecule two silicon-bonded hydrogen atoms and where phenyl groups constitute 30 to 70 mole % of silicon-bonded organic groups {the mole ratio of silicon-bonded hydrogen atoms contained in this component to the total sum of alkenyl groups contained in components (A) and (B) is in the range of 0.5 to 2}; and (D) a hydrosilylation catalyst in an amount sufficient to promote a hydrosilylation reaction between the alkenyl groups contained in components (A) and (B) and silicon-bonded hydrogen atoms contained in component (C).

The cross-linked product of the invention comprises a product obtained by cross-linking the above-described cross-linkable silicone composition.

Effects of Invention

The cross-linkable silicone composition of the invention can be cross-linked by a hydrosilylation reaction and is characterized by forming a cured product which at room temperature is solid and has high hardness and at high temperature becomes significantly soft or liquefied. The cross-linked product of the invention is characterized by being solid at room temperature and becoming significantly soft or liquefied at high temperature.

DETAILED DESCRIPTION OF THE INVENTION

Let us first consider the cross-linkable silicone composition of the invention.

Component (A), which is the main component of the composition, is represented by the following average unit formula:

$$(R^1_3SiO_{1/2})_a(R^1_2SiO_{2/2})_b(R^1SiO_{3/2})_c(SiO_{4/2})_d(R^2O_{1/2})_e.$$

In this formula, $R^1$ designate phenyl groups, alkyl or cycloalkyl groups having 1 to 6 carbon atoms, or alkenyl groups having 2 to 6 carbon atoms. The alkyl groups of $R^1$ can be exemplified by methyl, ethyl, propyl, butyl, pentyl, or hexyl groups. The cycloalkyl groups of $R^1$ can be exemplified by cyclopentyl or cyclohexyl groups. The alkenyl groups of $R^1$ can be exemplified by vinyl, allyl, butenyl, pentenyl, or hexenyl groups. In the above formula, the content of phenyl groups is in the range of 60 to 80 mole % of $R^1$, preferably 65 to 80 mole % of $R^1$. If the content of phenyl groups is below the recommended lower limit of the range, the obtained cross-linked product will be insufficiently soft at high temperatures. If, on the other hand, the content of phenyl groups exceeds the recommended upper limit of the range, this will impair transparency of the cross-linked product and reduce its mechanical, strength. In the above formula, the content of alkenyl groups is in the range of 10 to 20 mole % of $R^1$. If the content of alkenyl groups is below the recommended lower limit of the range, it will be difficult to impart sufficient hardness to a cross-linked product at room temperature. If, on the other hand, the content of the alkenyl groups exceeds the recommended upper limit of the range, the obtained cross-linked product will become insufficiently soft at high temperatures.

In the above formula, $R^2$ designates a hydrogen atom or an alkyl group having 1 to 6 carbon atoms. The alkyl groups of $R^2$ can be exemplified by methyl, ethyl, propyl, butyl, pentyl, or hexyl groups. The methyl and ethyl groups are preferable.

In the above formula, "a" is a number that shows percentage of siloxane units of the general formula: $R^1_3SiO_{1/2}$. This number satisfies the following condition: $0 \leq a \leq 0.2$, preferably $0 \leq a \leq 0.1$. If "a" exceeds the recommended upper limit of the range, the obtained cross-linked product will not acquire sufficient hardness at room temperature. In the above formula, "b" is a number that shows percentage of siloxane units of the general formula: $R^1_2SiO_{2/2}$. This number satisfies the following condition: $0.2 \leq b \leq 0.7$, preferably $0.4 \leq b \leq 0.7$. If "b" is below the lower limit of the range, the cross-linked product will become insufficiently soft at high temperatures. If, on the other hand, "b" exceeds the upper limit of the range, the cross-linked product will not possess sufficient hardness at room temperature. Furthermore, "c" is a number that shows percentage of siloxane units of general formula: $R^1SiO_{3/2}$. This number satisfies the following condition: $0.2 \leq c \leq 0.6$, preferably $0.3 \leq c \leq 0.6$. If "c" is below the lower limit of the range, the cross-linked product will not possess sufficient hardness at room temperature. If, on the other hand, "c" exceeds the upper limit of the range, the cross-linked product will become insufficiently soft at high temperatures. In the above formula, "d" is a number that shows percentage of siloxane units of general formula: $SiO_{4/2}$. This number satisfies the following condition: $0 \leq d \leq 0.2$, preferably $0 \leq d \leq 0.1$. If "d" is exceeds the upper limit of the range, the cross-linked product will not be sufficiently soft at high temperature. Furthermore, "e" is a number that shows percentage of units of general formula: $R^2O_{1/2}$. This number satisfies the following condition: $0 \leq e \leq 0.1$. If "e" exceeds the upper limit of the range, the cross-linked product will not possess sufficient hardness at room temperature. Finally, the sum of "a", "b", "c", and "d" is equal to 1.

Component (B) is used either to improve handleability of the composition or to adjust hardness of the obtained cross-linked product at room temperature. This component is an organopolysiloxane represented by the following general formula:

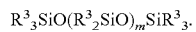

$R^3_3SiO(R^3_2SiO)_mSiR^3_3$.

In this formula, $R^3$ designate phenyl groups, alkyl or cycloalkyl groups having 1 to 6 carbon atoms, or alkenyl groups having 2 to 6 carbon atoms. The alkyl groups of $R^3$ can be exemplified by methyl, ethyl, propyl, butyl, pentyl, or hexyl groups. The cycloalkyl groups of $R^3$ can be exemplified by cyclopentyl or cyclohexyl groups. The alkenyl groups of $R^3$ can be exemplified by vinyl, allyl, butenyl, pentenyl, or hexenyl groups. In the above formula, the content of phenyl groups is in the range of 40 to 70 mole % of $R^3$, preferably 40 to 60 mole % of $R^3$. If the content of phenyl groups is below the recommended lower limit of the range, the obtained cross-linked product will not be sufficiently soft at high temperature. If, on the other hand, the content of phenyl groups exceeds the recommended upper limit of the range, the obtained cross-linked product will lose transparency, and its mechanical strength will be reduced. At least one $R^3$ should be an alkenyl group. This is because if the alkenyl group is absent, the present component will not participate in the cross-linking reaction and will bleed out from the cross-linked product.

In the above formula, "m" is an integer in the range of 5 to 100, preferably 10 to 50. If "m" is below the recommended lower limit of the range, this will impair mechanical strength of the obtained cross-linked product. If, on the other hand, "m" exceeds the recommended upper limit of the range, this will impair handleability of the obtained composition.

In the composition of the invention, component (B) should be contained in an amount of 0 to 20 parts by weight, preferably 0 to 15 parts by weight per 100 parts by weight of component (A). If the content of component (B) exceeds the recommended upper limit of the range, the obtained cross-linked product will not be sufficiently soft at high temperature.

Component (C) is a cross-linking agent of the composition. This component comprises an organopolysiloxane that has in one molecule two silicon-bonded hydrogen atoms and contains phenyl groups in the range 30 to 70 mole % of all silicon-bonded organic groups. As mentioned above, two silicon-bonded hydrogen atoms are contained in one molecule of component (C). This is because in case of less than two hydrogen atoms in one molecule the obtained cross-linked product will not possess sufficient hardness at room temperature. On the other hand, if the content of hydrogen atoms exceeds two, the cross-linked product will be insufficiently soft at high temperatures. The silicon-bonded organic groups contained in component (C) comprise monovalent hydrocarbon groups other than those having unsaturated aliphatic bonds and can be exemplified by methyl, ethyl, propyl, butyl, pentyl, hexyl, or other alkyl groups; cyclopentyl, cyclohexyl, or similar cycloalkyl groups; phenyl, tolyl, xylyl, or similar aryl groups; benzyl, phenethyl, or other aralkyl groups. The phenyl groups, or alkyl and cycloalkyl groups having 1 to 6 carbon atoms are preferable. The content of phenyl groups in component (C) is in the range of 30 to 70 mole % of all silicon-bonded organic groups. If the content of phenyl groups is below the recommended lower limit of the range, the obtained cross-linked product will not be sufficiently soft at high temperature. If, on the other hand, the content of phenyl groups exceeds the recommended upper limit of the range, the obtained cross-linked product will lose it transparency, and its mechanical strength will be impaired.

It is recommended that component (C) comprises an organotrisiloxane of the following general formula:

$(HR^4_2SiO)_2SiR^4_2$.

In the above formula, $R^4$ designate phenyl groups, or alkyl and cycloalkyl groups having 1 to 6 carbon atoms. The alkyl groups of $R^4$ can be exemplified by methyl, ethyl, propyl, butyl, pentyl, or hexyl groups. The cycloalkyl groups of $R^4$ can be exemplified by cyclopentyl or cyclohexyl groups. The content of phenyl groups is in the range of 30 to 70 mole % of $R^4$.

In the composition, component (C) is contained in such an amount that the mole ratio of silicon-bonded hydrogen atoms contained in this component to the total sum of alkenyl groups contained in components (A) and (B) ranges from 0.5 to 2, preferably from 0.5 to 1.5. If the content of component (C) is beyond the recommended range, the obtained cross-linked product will not possess sufficient hardness at room temperature.

Component (D) is a hydrosilylation catalyst used for accelerating a hydrosilylation reaction between alkenyl groups of components (A) and (B) and silicon-bonded hydrogen atoms of component (C). Component (D) can be exemplified by a platinum catalyst, rhodium catalyst, or palladium catalyst. For acceleration of curing of the composition the use of the platinum catalyst is preferable. The platinum catalyst can be exemplified by fine platinum powder, chloroplatinic acid, alcohol solutions of chloroplatinic acid, platinum-alkenylsiloxane complex, platinum-olefin complex, or platinum-carbonyl complex. The use of platinum-alkenylsiloxane complex is preferable. Such an alkenylsiloxane can be exemplified by 1,3-divinyl-1,1,3,3-tetramethyldisiloxane; 1,3,5,7-tetramethyl-1,3,5,7-tetravinylcyclotetrasiloxane; the same alkenylsiloxanes in which a part of methyl groups is substituted with ethyl groups, phenyl groups, etc; the same alkenylsiloxane in which vinyl groups are substituted with allyl groups, hexenyl groups, or the like. Platinum-alkenylsiloxane complexes, in particular, platinum-1,3-divinyl-1,1,3,3-tetramethyldisiloxane complexes are preferable in view of their stability. In order to further improve stability, the platinum-alkenylsiloxane complexes can be combined with 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, 1,3,5,7-tetramethyl-1,3,5,7-tetravinylcyclotetrasiloxane, or similar alkenylsiloxane or dimethylsiloxane oligomers, or similar organosiloxane oligomers. The addition of an alkenylsiloxanes is preferable.

There are no special restrictions with regard to the amounts in which component (D) can be used, provided that it accelerates the hydrosilylation reaction between alkenyl groups of components (A) and (B) and silicon-bonded hydrogen atoms of component (C). It may be recommended, however, to use component (D) in an amount such that the content of metallic atoms in the present component (in mass units) be in the range of 0.01 to 500 ppm, preferably 0.01 to 100 ppm, and more preferably 0.01 to 50 ppm. If component (D) is contained in an amount less than the recommended lower limit of the range, it will be difficult to provide complete cross-linking of the composition. If the content of component (D) exceeds the recommended upper limit of the range, a change in color may occur in the cross-linked product obtained from the composition.

The composition of the invention comprises at least aforementioned components (A) to (D). However, the composition may contain some arbitrary components such as 1-ethynylhexanol, 2-methyl-3-butyn-2-ol, 3,5-dimethyl-1-hexyn-3-ol, 2-phenyl-3-butyn-2-ol, or similar alkyne alcohols; 3-methyl-3-penten-1-yne, 3,5-dimethyl-3-hexen-1-yne, or a similar enyne compound; 1,3,5,7-tetramethyl-1,3,5,7-tetravinylcyclotetrasiloxane, 1,3,5,7-tetramethyl-1,3,5,7-tetrahexenylcyclotetrasiloxane, benzotriazole, or similar reaction inhibitors. There are no special restrictions with regard to amounts in which such reaction inhibitors can be used, but it may be recommended to add them in an amount of 1 to 5,000 ppm per weight of the composition.

In order to improve adhesion of the composition to a substrate with which it is in contact during curing, the composition may also contain an adhesion-imparting agent. Such an adhesion-imparting agent may comprise a linear, branched, or cyclic organosiloxane oligomer having 4 to 20 silicon atoms or an organosilane that contains trialkoxysiloxy groups (e.g., trimethoxysiloxy or triethoxysiloxy group) or trialkoxysilylalkyl groups (e.g., trimethoxysilylethyl or triethoxysilylethyl group) and organosilane (e.g., vinyl or allyl group); a linear, branched, or cyclic organosiloxane oligomer having 4 to 20 silicon atoms or an organosilane that contains trialkoxysiloxy groups or trialkoxysilylalkyl groups and methacryloxyalkyl groups (e.g., 3-methacryloxypropyl group); a linear, branched, or cyclic organosiloxane oligomer having 4 to 20 silicon atoms or an organosilane having trialkoxysiloxy groups or trialkoxysilylalkyl groups and epoxy-bonded alkyl groups {e.g., 3-glycidoxypropyl group, 4-glycidoxybutyl group, 2-(3,4-epoxycyclohexyl) ethyl group, or 3-(3,4-epoxycyclohexyl)propyl group}; reaction products of aminoalkyl trialkoxysilane and epoxy-bonded alkyl trialkoxysilane, epoxy-bonded ethylpolysilicate, more specifically, vinyltrimethoxysilane, allyltrimethoxysilane, allyltriethoxysilane, hydrogentriethoxysilane, 3-glycidoxypropyltrimethoxysilane, 3-glycidoxypropyltriethoxysilane, epoxycyclohexyl)-ethyltrimethoxysilane, 3-methacryloxypropyltrimethoxysilane, 3-methacryloxypropyltriethoxysilane, a reaction product of 3-glycidoxypropyl-trimethoxysilane and 3-aminopropyltriethoxysilane, a condensation reaction product of a methylvinylsiloxane oligomer capped at the molecular terminals with silanol groups and 3-glycidoxypropyltrimethoxysilane, a condensation reaction product of a methylvinylsiloxane oligomer capped at the molecular terminals with silanol groups and 3-methacryloxypropyltriethoxysilane, and tris(3-trimethoxysilylpropyl) isocyanurate.

Within the limits not contradictory to the objects of the present invention, the composition of the invention may be combined with other arbitrary components such as organopolysiloxanes other than aforementioned components (A) to (C); silica, glass, alumina, zinc oxide or similar inorganic fillers; polymethacrylate resin, or a similar organic resin powder; a heat-resistant agent, dye, pigment, fluorescent agent, flame retardant agent, solvent, etc.

There are no special restrictions with regard to viscosity of the composition at 25° C., but it is recommended that viscosity be in the range from 100 to 1,000,000 mPa·s, preferably 500 to 50,000 mPa·s. If viscosity is below the recommended lower limit of the range, this will reduce mechanical strength of the obtained cross-linked product. If, on the other hand, viscosity exceeds the recommended upper limit of the range, this will impair handleability of the composition.

The composition can be cross-linked at room temperature or by heating. However, for accelerating the process, cross-linking by heating is recommended. The heating temperature may be in the range of 50 to 200° C. The composition of the invention is cross-linked by a hydrosilylation reaction. Since the cross-linked product of the composition is solid and has high hardness at room temperature, e.g., at 25° C., and becomes soft or liquefied at high temperature, e.g., above 100° C., it is can be used in electrical and electronic applications as an adhesive agent, bonding agent, protective agent, coating agent, or under-filling agent. In particular, since the cross-linked product possesses high optical transparency, the composition is mostly suitable for use as an adhesive, bonding, coating, and under-filling agent in optical semiconductor devices.

The following is a detailed description of the cross-linked product of the invention.

The cross-linked product of the composition is characterized by the fact that at room temperature, e.g., at 25° C., it comprises a solid body of high hardness, e.g., like a hard rubber, while at high temperature, e.g., at 100° C. it becomes soft as a soft rubber or liquefied. It is recommended that at 25° C. the cross-linked product has type-A durometer hardness equal to or higher than 60 as specified by JIS K 6253. Furthermore, at the temperature of 100° C., the product should be either flowable or have type-A durometer hardness equal to or lower than 10. If the product is flowable at 100° C., its viscosity is not specially restricted, but it can be recommended that in that case viscosity be at least 0.1 Pa·s. A cross-linked product with above-described specific properties can be used in the form of a thermoplastic film or sheet deformable by heating.

EXAMPLES

The cross-linkable silicone composition and the cross-linked product of the invention will be further described in detail by way of application examples. In the examples given below, the values of viscosity were obtained at 25° C. In the subsequent formulas, Me, Ph, and Vi designate methyl groups, phenyl groups, and vinyl groups, respectively. Hardness of the cross-linked products was measured by a type A durometer as specified by JIS K 6253 (Rubber, Vulcanized or Thermoplastic—Determination or Hardness).

Application Example 1

First, 75 parts by weight of methylvinylphenylpolysiloxane represented by the following average unit formula:

$(MeViSiO_{2/2})_{0.25}(Ph_2SiO_{2/2})_{0.3}(PhSiO_{3/2})_{0.45}(HO_{1/2})_{0.03}$ and 25 parts by weight of trisiloxane represented by the following formula:

$(HMe_2SiO)_2SiPh_2$ (this component contained 1.11 moles of silicon-bonded hydrogen atoms per 1 mole of vinyl groups of the aforementioned methylvinylphenylpolysiloxane) were uniformly mixed. Following this, the mixture was combined and admixed with 1,3-divinyl-1,1,3,3-tetramethyldisiloxane solution of a platinum-1,3-divinyl-1,1,3,3-tetramethyldisiloxane complex (in this component in terms of weight units the content of metallic platinum was 5 ppm per weight of the composition) and 1-ethynylhexanol (in terms of weight units this component was used in an amount of 250 ppm per weight of the composition). As a result, a cross-linkable silicone composition having viscosity of 8,400 mPa·s at 25° C. was obtained.

A cross-linked product was formed by heating the composition for 2 hours at 150° C. The obtained product comprised a hard-resin like body with type A durometer hardness of 90 at 25° C. At 100° C., the product comprised a soft-rubber like body with type A durometer hardness of 9.

Application Example 2

First, 70 parts by weight of methylvinylphenylpolysiloxane represented by the following average unit formula:

$(MeViSiO_{2/2})_{0.25}(Ph_2SiO_{2/2})_{0.3}(PhSiO_{3/2})_{0.45}(HO_{1/2})_{0.03}$ and 30 parts by weight of trisiloxane represented by the following formula:

$(HMe_2SiO)_2SiPh_2$ (this component contained 1.43 moles of silicon-bonded hydrogen atoms per 1 mole of vinyl groups of the aforementioned methylvinylphenylpolysiloxane) were uniformly mixed. Following this, the mixture was combined and admixed with 1,3-divinyl-1,1,3,3-tetramethyldisiloxane solution of a platinum-1,3-divinyl-1,1,3,3-tetramethyldisiloxane complex (in this component in terms of weight units the content of metallic platinum was 5 ppm per weight of the composition) and 1-ethynylhexanol (in terms of weight units this component was used in an amount of 250 ppm per weight of the composition). As a result, a cross-linkable silicone composition having viscosity of 6,600 mPa·s at 25° C. was obtained.

A cross-linked product was formed by heating the composition for 2 hours at 150° C. The obtained product comprised a hard-resin like body with type A durometer hardness of 78 at 25° C. At 100° C., the product comprised a liquid with a viscosity of 220 Pa·s was obtained.

Application Example 3

First, 75 parts by weight of methylvinylphenylpolysiloxane represented by the following average unit formula:

$(MeViSiO_{2/2})_{0.25}(Ph_2SiO_{2/2})_{0.3}(PhSiO_{3/2})_{0.45}(HO_{1/2})_{0.03}$ 10 parts by weight of methylphenylpolysiloxane represented by the following formula:

$ViMe_2SiO(MePhSiO)_{17.5}SiViMe_2$ and 25 parts by weight of trisiloxane represented by the following formula:

$(HMe_2SiO)_2SiPh_2$ (this component contained 1.02 moles of silicon-bonded hydrogen atoms per 1 mole of vinyl groups in the sum of the methylvinylphenylpolysiloxane and methylphenylpolysiloxane) were uniformly mixed. Following this, the mixture was combined and admixed with 1,3-divinyl-1,1,3,3-tetramethyldisiloxane solution of a platinum-1,3-divinyl-1,1,3,3-tetramethyldisiloxane complex (in this component in terms of weight units the content of metallic platinum was 500 ppm per weight of the composition) and 1-ethynylhexanol (in terms of weight units this component was used in an amount of 250 ppm per weight of the composition). As a result, a cross-linkable silicone composition having viscosity of 4,500 mPa·s at 25° C. was obtained.

A cross-linked product was formed by heating the composition for 2 hours at 150° C. The obtained product comprised a hard-resin like body with type A durometer hardness of 83 at 25° C. At 100° C., the product comprised a soft-rubber like body with type A durometer hardness of 6.

Application Example 4

A cross-linked product was formed from the silicone composition of Application Example 3 by heating the composition for 30 minutes at 120° C. The obtained product comprised a hard-resin like body with type A durometer hardness of 75 at 25° C. At 100° C., the product comprised a liquid with viscosity of 120 Pa·s.

Application Example 5

First, 70 parts by weight of methylvinylphenylpolysiloxane represented by the following average unit formula:

$(MeViSiO_{2/2})_{0.25}(Ph_2SiO_{2/2})_{0.3}(PhSiO_{3/2})_{0.45}(HO_{1/2})_{0.03}$ 10 parts by weight of methylphenylpolysiloxane represented by the following formula:

$$ViMe_2SiO(MePhSiO)_{17.5}SiViMe_2$$

and 30 parts by weight of trisiloxane represented by the following formula:

$$(HMe_2SiO)_2SiPh_2$$

(this component contained 1.30 moles of silicon-bonded hydrogen atoms per 1 mole of vinyl groups in the sum of the methylvinylphenylpolysiloxane and methylphenylpolysiloxane) were uniformly mixed. Following this, the mixture was combined and admixed with 1,3-divinyl-1,1,3,3-tetramethyldisiloxane solution of a platinum-1,3-divinyl-1,1,3,3-tetramethyldisiloxane complex (in this component in terms of weight units the content of metallic platinum was 5 ppm per weight of the composition) and 1-ethynylhexanol (in terms of weight units this component was used in an amount of 250 ppm per weight of the composition). As a result, a cross-linkable silicone composition having viscosity of 4,000 mPa·s at 25° C. was obtained.

A cross-linked product was formed by heating the composition for 2 hours at 150° C. The obtained product comprised a hard-resin like body with type A durometer hardness of 70 at 25° C. At 100° C., the product comprised a liquid with a viscosity of 250 Pa·s.

INDUSTRIAL APPLICABILITY

The cross-linkable silicone composition of the invention is suitable for use as adhesives, potting agents, protective agents, or underfills in electrical and electronic applications. In particular, since the composition has high light transmittance, the composition is suitable for use as adhesives, potting agents, protective agents, coating agents, or underfills in optical semiconductor devices.

The invention claimed is:

1. A cross-linkable silicone composition comprising at least the following components:
   (A) an organopolysiloxane represented by the following average unit formula:

$$(R^1{}_3SiO_{1/2})_a(R^1{}_2SiO_{2/2})_b(R^1SiO_{3/2})_c(SiO_{4/2})_d(R^2O_{1/2})_e$$

where $R^1$ are phenyl groups, alkyl or cycloalkyl groups having 1 to 6 carbon atoms, or alkenyl groups having 2 to 6 carbon atoms, and where 60 to 80 mole % of $R^1$ are phenyl groups and 10 to 20 mole % of $R^1$ are alkenyl groups; $R^2$ is a hydrogen atom or an alkyl group having 1 to 6 carbon atoms; and "a", "b", "c", "d", and "e" are numbers that satisfy the following conditions: $0 \le a \le 0.2$; $0.2 \le b \le 0.7$; $0.2 \le c \le 0.6$; $0 \le d \le 0.2$; $0 \le e \le 0.1$; and $a+b+c+d=1$;
   (B) an organopolysiloxane represented by the following general formula:

$$R^3{}_3SiO(R^3{}_2SiO)_mSiR^3{}_3$$

where $R^3$ are phenyl groups, alkyl or cycloalkyl groups having 1 to 6 carbon atoms, or alkenyl groups having 2 to 6 carbon atoms, and where 40 to 70 mole % of $R^3$ are phenyl groups and at least one $R^3$ is an alkenyl group; and "m" is an integer in the range of 5 to 100, wherein component (B) is used in an amount of 0 to 20 parts by weight per 100 parts by weight of component (A);
   (C) an organopolysiloxane having in one molecule two silicon-bonded hydrogen atoms and where phenyl groups constitute 30 to 70 mole % of silicon-bonded organic groups and where the mole ratio of silicon-bonded hydrogen atoms contained in this component to the total sum of alkenyl groups contained in components (A) and (B) is in the range of 0.5 to 2; and
   (D) a hydrosilylation catalyst in an amount sufficient to promote a hydrosilylation reaction between the alkenyl groups contained in components (A) and (B) and silicon-bonded hydrogen atoms contained in component (C).

2. The cross-linkable silicone composition according to claim 1, wherein component (C) is an organopolysiloxane represented by the following general formula:

$$(HR^4{}_2SiO)_2SiR^4{}_2$$

where $R^4$ designate phenyl groups, or alkyl and cycloalkyl groups having 1 to 6 carbon atoms, and where 30 to 70 mole % of $R^4$ are phenyl groups.

3. A cross-linked product obtained by subjecting the cross-linkable silicone composition according to claim 2 to a hydrosilylation reaction.

4. The cross-linked product according to claim 3, wherein the cross-linked product has type A durometer hardness at 25° C. according to JIS K 6253 equal to or greater than 60.

5. The cross-linked product according to claim 3, wherein the cross-linked product has type A durometer hardness at 100° C. according to JIS K 6253 equal to or lower than 10.

6. A cross-linked product obtained by subjecting the cross-linkable silicone composition according to claim 1 to a hydrosilylation reaction.

7. The cross-linked product according to claim 6, wherein the cross-linked product has type A durometer hardness at 25° C. according to JIS K 6253 equal to or greater than 60.

8. The cross-linked product according to claim 6, wherein the cross-linked product has type A durometer hardness at 100° C. according to JIS K 6253 equal to or lower than 10.

9. The cross-linkable silicone composition according to claim 1, further comprising a reaction inhibitor selected from the group of an alkyne alcohol, an enyne compound, 1,3,5,7-tetramethyl-1,3,5,7-tetravinylcyclotetrasiloxane, 1,3,5,7-tetramethyl-1,3,5,7-tetrahexenylcyclotetrasiloxane, or benzotriazole.

10. The cross-linkable silicone composition according to claim 1, further comprising an adhesion-imparting agent comprising a linear, branched, or cyclic organosiloxane oligomer having 4 to 20 silicon atoms, or an organosilane.

* * * * *